US011454234B2

(12) United States Patent
Vadasz Fekete (10) Patent No.: US 11,454,234 B2
(45) Date of Patent: Sep. 27, 2022

(54) MECHANICALLY ACTUATED TRAVELLING PLUG VALVE

(71) Applicant: Amnon M. Vadasz Fekete, San Antonio de los Altos (VE)

(72) Inventor: Amnon M. Vadasz Fekete, San Antonio de los Altos (VE)

(*) Notice: Subject to any disclaimer, the term of this patent is extended or adjusted under 35 U.S.C. 154(b) by 684 days.

(21) Appl. No.: 16/471,461

(22) PCT Filed: Dec. 19, 2017

(86) PCT No.: PCT/CA2017/051534
§ 371 (c)(1),
(2) Date: Jun. 19, 2019

(87) PCT Pub. No.: WO2018/112614
PCT Pub. Date: Jun. 28, 2018

(65) Prior Publication Data
US 2021/0131424 A1    May 6, 2021

(30) Foreign Application Priority Data

Dec. 20, 2016 (MX) ............... MX/a/2016/017228

(51) Int. Cl.
| F04B 53/12 | (2006.01) |
| F16K 1/12 | (2006.01) |
| F16K 1/38 | (2006.01) |
| F04B 15/02 | (2006.01) |
| F04B 47/00 | (2006.01) |
| F16K 1/42 | (2006.01) |

(52) U.S. Cl.
CPC ........... *F04B 53/129* (2013.01); *F04B 15/02* (2013.01); *F04B 47/00* (2013.01); *F04B 53/122* (2013.01); *F16K 1/12* (2013.01); *F16K 1/38* (2013.01); *F16K 1/42* (2013.01)

(58) Field of Classification Search
CPC .... F04B 53/129; F04B 53/125; F04B 53/122; F04B 53/12; F04B 53/10; F04B 47/00; F04B 15/02; F16K 1/12; F16K 1/385; F16K 1/38; F16K 1/36; F16K 1/34; F16K 1/42
See application file for complete search history.

(56) References Cited

U.S. PATENT DOCUMENTS

| 32,658 | A | * | 6/1861 | Thomas | ................ F04B 53/122 417/513 |
| 51,007 | A | * | 11/1865 | Boeklen | ................ F04B 53/122 417/513 |
| 61,209 | A | * | 1/1867 | Kelly | ................ F04B 53/122 417/511 |
| 1,614,000 | A | * | 1/1927 | Hendricks | ............. F04B 53/122 417/511 |
| 1,738,167 | A | * | 12/1929 | Berkey | .................... F04B 53/14 417/513 |

(Continued)

*Primary Examiner* — David Colon-Morales
(74) *Attorney, Agent, or Firm* — Kyle R Satterthwaite; Ryan W Dupuis; Ade & Company Inc.

(57) ABSTRACT

A mechanically actuated traveling valve for use in fluid pumping equipment is provided. More particularly, a mechanically actuated traveling plug valve having a valve seat and a valve plug is provided for use in any positive displacement pump with a reciprocating element (either the plunger or the cylinder) capable of pumping fluids of any viscosity, with any gas to liquid ratio, operating at any inclination angle.

15 Claims, 1 Drawing Sheet

(56) References Cited

U.S. PATENT DOCUMENTS

| | | | | |
|---|---|---|---|---|
| 3,822,970 A | * | 7/1974 | Smith | F04B 47/02 |
| | | | | 417/552 |
| 4,332,533 A | * | 6/1982 | Spears | F04B 47/02 |
| | | | | 417/513 |
| 4,591,315 A | * | 5/1986 | Vadasz Fekete | F04B 53/122 |
| | | | | 417/520 |
| 4,591,316 A | * | 5/1986 | Vadasz Fekete | F04B 53/122 |
| | | | | 417/520 |
| 4,708,597 A | * | 11/1987 | Fekete | F04B 53/122 |
| | | | | 417/520 |
| 4,740,141 A | * | 4/1988 | Fekete | F04B 53/122 |
| | | | | 417/520 |
| 5,407,333 A | * | 4/1995 | Lambright | F04B 53/122 |
| | | | | 417/520 |
| 10,161,395 B2 | * | 12/2018 | Vadasz | F16K 1/44 |

* cited by examiner

MECHANICALLY ACTUATED TRAVELLING PLUG VALVE

TECHNICAL FIELD

A mechanically actuated traveling valve for use in fluid pumping equipment is provided. More particularly, a mechanically actuated traveling plug valve is provided for use in any positive displacement pump with a reciprocating element (either the plunger or the cylinder) capable of pumping fluids of any viscosity with any amount of gas dissolved in the liquid phase of the fluid, operating at any inclination angle.

BACKGROUND

Since the most popular application for positive displacement pumps with a reciprocating element (either the plunger or the cylinder) is the oil industry, for simplicity purposes, all the explanations herein will be referred to positive displacement subsurface pumps as used for the artificial lift of oil from the well to the surface.

In the oil industry, various types of subsurface pumps are used for extracting crude oil from the reservoir to the surface. Among conventional artificial lift systems, the most prevalent type is mechanically driven subsurface pumps activated from the surface by means of a beam or other pumping unit through a sucker rod string.

Such pumps are capable of handling very high reservoir temperatures resulting from advanced recovery techniques (e.g., the injection of steam, in-situ combustion or any other method to lower the viscosity of the heavy and extra heavy crude oil). Due to the limited diameter of mechanical subsurface pumps and the number of strokes per unit of time at which they can operate, it is essential to achieve maximum volumetric efficiency at each pump stroke.

In mechanically actuated positive displacement subsurface pumps, the valve attached to the component that induces reciprocating motion is known as the traveling valve; while, the valve attached to the stationary component is known as the standing valve. The traveling and standing valves are basically retention valves arranged so that both allow fluid flow in the same direction. Consequently, the relative motion between these two valves produces the pumping action.

Mechanical pump traveling valves can be configured such that valve elements act as a plug and a seat, where fluid flows in one direction when the plug becomes separated from the seat by the pressure differential at both sides of the valve. The plug and seat may have any shape; provided that when the plug contacts the seat, there must be a hermetic seal between them, in order to prevent reverse flow when the valve is closed. Currently, the most commonly used configuration in the oil industry for the plug is a ball or sphere and in this case, said valve is referred to as "ball and seat" valve.

In order to allow interchangeability between manufacturers, the American Petroleum Institute (API) established the Standard API 11AX, which standardizes some component dimensions, particularly threads and tolerances, but does not take into account the design nor the flow areas through the various subsurface pump components.

When pumping crudes with high gas to oil ratio, conventional subsurface pumps with ball and seat valves are somewhat inefficient. Due to a pressure drop that occurs between the traveling and standing valves within the subsurface pump in the suction phase, part of the gas separates from the oil and creates a gas chamber between the traveling valve and the liquid phase of the oil flowing across the standing valve. Since both valves require a pressure differential for the ball to separate from the seat, it is necessary to compress the gas during the discharge phase until the gas pressure inside the pump cylinder exceeds the pressure of the fluid column downstream the traveling valve. In most cases, the mobile component plummets into the oil causing a strong fluid pound effect, slowly harming the pump and decreasing its lifespan. Furthermore, if too much gas breaks out of the oil, a gas lock condition may develop when during the discharge stage, the gas pressure inside the pump cylinder cannot overcome the pressure of the fluid column downstream the traveling valve. When this happens, the pump behaves like a pneumatic spring, maintaining this gas lock condition for several pump strokes until the submergence (i.e., the distance from the dynamic fluid level to the subsurface pump standing valve) increases sufficiently, so that the weight of the fluid column (in the annular space between the casing and the tubing strings) produces a greater pressure at the standing valve intake than the pressure within the pump cylinder during its suction phase, thus allowing for some oil to enter the pump cylinder through said standing valve. Once oil enters the fluid chamber within the pump cylinder, the pumping action will resume until the submergence decreases again, consequently lowering the pressure at the standing valve intake and the gas lock condition is repeated. The gas lock condition is considered as the most unfavorable case, since when this condition occurs, many pump strokes are wasted until the pumping action is resumed. It is important to point out that before and after the gas lock condition occurs, there will be severe fluid pounding.

Attempts have been made to overcome these fluid pounding and gas lock problems, by affixing an annular valve to the discharge end of the subsurface pump cylinder to support the counter pressure generated by the weight of the oil column, significantly reducing the pressure differential required to open the traveling valve by the gas trapped between the traveling valve and the liquid phase of the crude oil within the pump cylinder and increasing, to some extent, the volumetric efficiency of the pump.

In order to address the low volumetric efficiency when pumping fluids with high gas to oil ratio, valves having a single plug and seat have been developed where the plug (directly connected to the sucker rod string through a rod) is forced to move with a reciprocating motion induced from the surface by a beam or other pumping unit, while the plunger moves freely between the plug and a stop. In this case, the plunger can have a seat attached to it, such that whenever the plug contacts the seat, a seal is formed, and when they separate the fluid is able to flow. In such systems, the plug can be separated from the seat due to: (i) the weight of the sucker rod string which acts directly on the plug, (ii) the pressure differential between the suction side and the discharge side of the traveling valve, and (iii) the friction between the outer surface of the plunger and the inner surface of the pump barrel acting on said moveable component. This type of traveling valve, mechanically actuated due to the reciprocating motion induced from the surface through the sucker rod string, can open much faster and is more efficient than conventional ball and seat valves (including subsurface pumps with annular valve); however, annular valves could also be implemented when handling very high gas to oil ratios.

Several configurations of pumps having mechanically actuated single plug and seat traveling valves exist, including the VR-S™ disclosed in U.S. Pat. Nos. 4,591,316 and 4,708,597, Canada Patent No. 1,221,875, the LOC-NO™ plunger manufactured by Dover (designed by Harbisson Fisher), and the GAS HANDLER™ manufactured by Weatherford, and others. In all of these designs, the traveling valve is specifically located at the plunger's suction end. Said traveling valve has its valve seat attached to the suction end of the plunger; while its mechanically actuated plug, connected to a long stem that runs within the entire length of the plunger, is located outside prior to said suction end of the plunger.

Such single plug retention valves require that the traveling valve, rather than the plunger, plummet into the liquid phase of the crude oil within the pump chamber. However, if the intake end of the plunger contacted the fluid before the traveling valve, then the drag force acting on the plunger could very significantly aid in an earlier opening of said valve (allowing for a greater pump filing, thus improving its volumetric efficiency) and at the same time extend said valve's useful life, since the fluid pound would be on the plunger and not on the sealing elements of the traveling valve.

Conventional pumps have been somewhat successful to meet the pumping requirements of fluids with high gas to oil ratio, produced in vertical or slightly deviated wells; however, known pump designs can become somewhat inefficient when pumping oil of any viscosity: (a) with steam due to the injection of steam into the well or adjacent wells to lower the viscosity of heavy and extra heavy crude oil, (b) with separated gas from the crude oil due to high gas to oil ratio, or (c) in horizontal or highly deviated wells.

There is a need for a traveling valve design, located anywhere along the entire length of the plunger or at its discharge end, for increasing the performance of mechanically actuated positive displacement subsurface pumps, the traveling valve being capable of significantly reducing oil seepage (at any pump inclination angle) and being able to pump a greater amount of fluid.

SUMMARY OF THE INVENTION

Pumping crudes with high gas content using conventional mechanical positive displacement pumps can be inefficient due to the low pumping rate that must be imparted in order to avoid a large pressure differential that separates the gas from the high gas to oil ratio fluid. Moreover, if the pump must work at any significant deviation angle from the vertical, the pumping efficiency can also be affected by the increased seepage of fluid across the sealing elements of both standing and traveling valves.

In order to reduce the effect of these limitations, a mechanically actuated traveling valve is provided having a plug and a seat. According to embodiments herein, intermittently at each valve during the suction and discharge phases, their obturator can form a seal against the seat. In this arrangement, the annular flow area outside the traveling valve plug must be substantially equal to the annular flow area inside said valve seat. Furthermore, the conical flow area generated by the separation distance between the sealing surfaces of the valve plug and seat must be equal to or greater to the annular flow area inside the valve seat. Only when both of these conditions are simultaneously satisfied, the traveling valve will offer the least pressure drop and maximum flow. The present traveling valve configuration allows the gas within the subsurface pump to be displaced in each stroke, thus permitting a larger volumetric efficiency, consequently increasing the amount of fluid that can be pumped in the same time period. In prior art, only the flow areas within the valve seat and outside the plug where considered, disregarding the flow area generated by the separation distance between the sealing surfaces of the valve. This is a major drawback in prior art, since it is impossible to maximize flow and minimize pressure drop across the valve, if the flow area generated by the separation distance between the sealing surfaces of the valve plug and seat is smaller than the flow area through the valve seat.

It is very important to point out, that since the present traveling valve is mechanically actuated, it can be located, for Case A, anywhere within or at the discharge end of the plunger when the plunger is the moveable component of the pump, or for Case B, at the discharge end of the pump cylinder or barrel (according to Standard API 11AX nomenclature) when said pump cylinder or barrel is the movable component of the pump, which is a major difference with respect to prior art, where the traveling valve is specifically located at the suction end of the plunger. In such embodiments, the valve can comprise (i) a housing with an inner periphery which is either part of or is attached to the moving element of the subsurface pump, (ii) a reciprocating valve stem having a first end and a second end, and having an outer periphery, (iii) valve stem reciprocating motion inducing element connected to the valve stem by a valve connector for imparting reciprocating movement from the reciprocating motion inducing element to the valve stem, (iv) a valve seat secured within the housing, the valve seat having an inner periphery, where the inner periphery of the valve seat and the outer periphery of the valve stem defining the valve seat annular fluid flow area, and (v) a valve plug connected to the valve stem at its second end, the valve plug having an outer periphery, where the outer periphery of the valve plug and the inner periphery of the housing defining the valve plug annular fluid flow area. In this case, the size or capacity of the valve seat fluid flow area must be substantially equal to the valve plug fluid flow area. At the same time, in order to assure minimum pressure drop and maximum flow across the valve, the conical surface of revolution flow area generated by the separation distance between the suction end of the valve seat and the discharge end of the valve plug must be substantially equal to or greater than the annular seat flow area.

Reciprocating movement of the valve stem opens and closes the valve. As such, the valve will open primarily due to the force exerted on the valve plug thereon by the reciprocating motion inducing element on the valve stem, in addition to any pressure differential between the intake and discharge ends of the valve, the friction between the outer surface of the plunger and the inner surface of the pump cylinder and perhaps most important, the drag force that is generated on the plunger as it plunges and submerges into the liquid phase of the oil within the cylinder of the subsurface pump, enabling the gas of highly gaseous fluids to be handled more adequately. Further, because the components of the valve are guided as the reciprocating movement of the valve stem opens and closes the valve, the oil seepage across said valve is significantly reduced; therefore, any subsurface pump assembled with the present mechanically actuated plug valve, can operate efficiently at any inclination angle.

Other objects, advantages and features of the present invention will become clear from the following detailed description of the invention when read in conjunction with the drawing and appended claims.

DESCRIPTION OF THE EMBODIMENTS

Mechanically actuated positive displacement pumps or compressors can comprise at least one traveling and one standing valve. Traveling valves can be affixed to the reciprocally moving portion of such pumps or compressors. According to embodiments herein, the present mechanically actuated traveling valve can be located anywhere within the entire length of the plunger, or at the discharge end of the plunger, in instances where said plunger is the moveable component of the pump or compressor; or located at the discharge end of the pump cylinder in instances where said pump cylinder is the moveable component of the pump or compressor. Although reference herein is made to mechanically actuated subsurface pumps used in the oil industry, embodiments of the present system can be operable with any other positive displacement pump or compressor.

More specifically, the present mechanically actuated traveling valve may be fixedly attached to the moveable component of the positive displacement subsurface pump, resulting in two possibilities:

Case A, where the traveling valve is located anywhere within the entire length of, or at the discharge end of, the plunger for instances in which said plunger is the moveable component of the pump or compressor and the pump cylinder or barrel (according to Standard API 11AX nomenclature) is the stationary component of the pump or compressor; and Case B, where the traveling valve is located at the discharge end of the barrel for instances in which said barrel is the moveable component of the pump or compressor, and the plunger is the stationary component of the pump or compressor.

Since in both cases, the components of the mechanically actuated traveling valve are guided, the positive displacement subsurface pumps where these valves are implemented, can operate efficiently at any deviation angle. It is important to point out that in prior art, the traveling valve was located specifically at the suction end of the plunger in instances where the plunger was the moveable component and the pump cylinder was the stationary component. Furthermore, prior art mechanically actuated traveling valves could not be used in pumps where the pump cylinder was the movable component and the plunger the stationary component.

Figure 1:
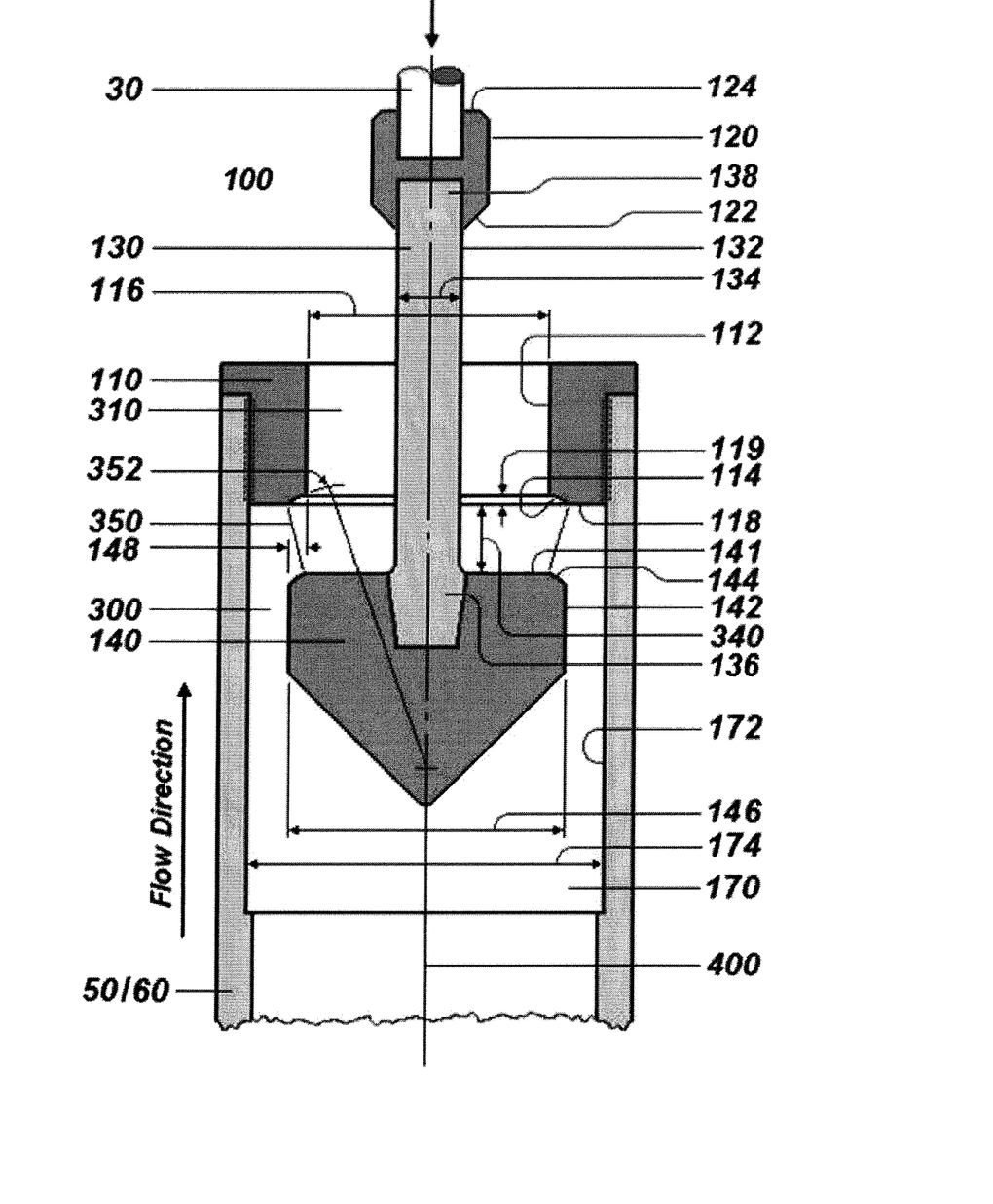
FIG. 1 is a longitudinal sectional view through the mechanically actuated traveling valve according to embodiments herein, the valve being in the "open" position.

Having regard to FIG. 1, a mechanically actuated traveling valve 100 offering an increased flow area and minimum pressure drop is provided, and is illustrated in an open position (FIG. 1). Valve 100 comprises valve seat 110, valve connector 120, valve stem 130 and valve plug 140. The valve is contained in a valve housing 170 located at the discharge end of the plunger 50 for Case A, or at the discharge end of the barrel 60 for Case B. For ease of illustration, only a single drawing is presented, in which the movable component is generically labelled as 50/60, since this component may be either the plunger for Case A, or the barrel 60 for Case B. Valve plug 140 can be part of, or be attached by any means, at its discharge end 141 to the suction end 136 of the valve stem 130; which in turn has its discharge end 138 attached by any means to valve connector 120. The valve plug 140 is limited to open to a specific distance 340 from the valve seat 110. That is, the available distance by which the valve plug can travel from the valve seat is limited to a predetermined maximum. This farthest attainable position of valve plug 140 from valve seat 110 defines the minimum length of the traveling valve housing 170. The axis of each of these valve components moves along the subsurface pump's longitudinal axis 400.

Valve connector 120 serves to induce the reciprocal motion from the reciprocating motion inducing element 30 (e.g., in the oil industry, the last sucker rod, the lower end of a continuous rod, the rod valve or any other means) to valve stem 130. The discharge end 124 of said valve connector 120 is connected by any means to the reciprocating motion inducing element 30; while the valve connector's suction end 122 is also connected by any means to the discharge end 138 of valve stem 130.

In the embodiment illustrated herein for valve 100, the seat annular flow area 310, defined by the inner peripheral surface 112 of valve seat 110 and the outer peripheral surface 132 of valve stem 130, must be substantially equal to plug annular flow area 300 defined by the outer peripheral surface 142 of valve plug 140 and the inner peripheral surface 172 of valve housing 170. Both seat annular flow area 310 and plug annular flow area 300 lie in a plane normal to the longitudinal axis 400.

Valve connector 120 and valve plug 140, can be guided by any means in order to assure that when traveling valve 100 is closed, the sealing surface 114 at the suction end 118 of valve seat 110 and the sealing surface 144 at the discharge end 141 of valve plug 140 seal against each other to form a hermetic seal. The foregoing is accomplished because the outside diameter 146 of said valve plug 140 is greater than the inside diameter 116 of the valve seat 110. A preferred sealing surface of the components herein corresponds to a spherical zone, whereby the matching spherical contours of these surfaces allow for slight angular misalignment without breaking up the seal; however, it should be understood that the sealing surfaces might have any other configuration, or even line contact instead of surface contact, provided that when the two sealing elements are in contact with each other, a perfect seal is maintained.

In FIG. 1, the separation distance 340 at which the discharge end 141 of valve plug 140 separates from the suction end 118 of valve seat 110 when the mechanically actuated traveling plug valve 100 is in its open position, is established by the seat annular flow area 310; in the sense that the conical surface of revolution flow area 350 generated by said separation distance 340 must be equal to or greater than the seat annular flow area 310.

The mechanically actuated plug traveling valve 100 will minimize pressure drop and maximize flow area across its components, only when the above flow area conditions are met simultaneously, that is: (i) seat annular flow area 310 must be substantially equal to plug annular flow area 300, and at the same time (ii) conical surface of revolution flow area 350 must be substantially equal to or greater than seat annular flow area 310.

In order to maximize pumping efficiency, the surfaces of valve plug 140 and valve seat 110 which will be contacted by the flowing fluid, should be hydrodynamic and as smooth as possible so as to reduce drag and thereby further reduce the pressure drop which may occur as the fluid passes over these surfaces.

Since the traveling valve 100 operates mainly mechanically, that is, it will open and close in a forced manner due to the induced force on valve plug 140, the valve can be positioned anywhere within the entire length of plunger 50 or at the plunger's discharge end for Case A; while for Case B, the location of said mechanically actuated traveling valve 100 can only be at the discharge end of the moveable barrel 60. A preferred positioning of the mechanically actuated traveling valve 100 in Case A, could also be at the discharge end of plunger 50; this allows for the same valve design to be used in both Cases A and B.

By providing a mechanically actuated traveling valve 100, complying simultaneously with the above established flow area and separation distance specifications, pressure drop can be minimized and flow maximized across the valve, thereby maximizing pumping efficiency and prohibiting the phenomena of gas lock and/or steam lock.

The reciprocating motion inducing element 30 (which, depending on the type of subsurface pump being used, could be: the rod valve, the last sucker rod, the lower end of a continuous rod or any other means capable of transmitting reciprocating motion) induces said reciprocating motion to stem 130 through connector 120. This connector 120 is affixed by any means at its discharge end 124 to said reciprocating motion inducing element 30 and to the discharge end 138 of stem 130 at its suction end 122.

The mechanically actuated traveling valve 100, can comprise the following flow areas: (i) plug annular flow area 300 around valve plug 140, as determined by the inner peripheral surface 172 that dimensionally corresponds to the inner diameter 174 of valve housing 170, and the outer peripheral surface 142 that dimensionally corresponds to the outer diameter 146 of valve plug 140; and (ii) seat annular flow area 310 at valve seat 110, as determined by the inner peripheral surface 112 that dimensionally corresponds to the inner diameter 116 of valve seat 110, and the outer peripheral surface 132 that dimensionally corresponds to the outer diameter 134 of valve stem 130. In order to form a hermetic seal between the suction end 118 of valve seat 110 and the discharge end 141 of valve plug 140, it is necessary that the external diameter 146 of said valve plug 140 be greater than the internal diameter 116 of said valve seat 110. Overlap 148 is attained by half of the difference between external diameter 146 of valve plug 140 and internal diameter 116 of valve seat 110. In order to attain the maximum flow areas across the mechanically actuated traveling valve 100, overlap 148 must be as small as possible.

Overlap 148 is established as a design parameter taking into account the stresses to which the contacting surfaces will be exposed, while at the same time assuring a hermetic seal between the components. Likewise, the inner diameter 174 of valve chamber 170, is pre-established by subsurface pump manufacturers or are prescribed in norms and standards related to the subject matter; while the outer diameter 134 of valve stem 130 is also a design parameter established by the yield strength of the material and the cyclic efforts to which this component will be exposed, plus whatever safety factor is considered appropriate. Therefore, overlap 148 or S, the inner diameter 174 or Dc of valve housing 170 and the outer diameter 134 or Dv of valve stem 130, are well known or established by those skilled in the art. Taking into account these parameters, and establishing that the first condition to attain maximum fluid flow and minimum pressure drop through the mechanically actuated traveling valve 100, requires that seat annular flow area 310 between the inner periphery 112 of valve seat 110 and the outer periphery 132 of valve stem 130 be substantially equal to the external plug annular flow area 300 between the inner periphery 172 of valve housing 170 and outer periphery 142 of plug 140, it is possible to determine the inner diameter 116 or Di of valve seat 110 and the outer diameter 146 or Dp of valve plug 140.

The inner diameter 116 or Di of the valve seat 110 can be calculated based on the following relationship:

$$Di = -S + \sqrt{-2S^2 + \left(\frac{Dc^2 + Dv^2}{2}\right)}$$

where S, Dc and Dv are, as mentioned before, established design parameters.

The outer diameter 146 or Dp of valve plug 140 can be calculated based on the following relationship:

$$Dp = Di + 2S$$

The seat annular fluid flow area 310 or Ai that is delimited between the inner periphery 112 of said valve seat 110 and the outer periphery 132 of the valve stem 130 can be calculated based on the following relationship:

$$Ai = \frac{\pi}{4}(Di^2 - Dv^2)$$

The plug annular fluid flow area 300 or Ap delimited by the inner periphery 172 of the valve housing 170 and the outer periphery 142 of the valve plug 140 can be calculated based on the following relationship:

$$Ap = \frac{\pi}{4}(Dc^2 - Di^2)$$

The conical surface of revolution flow area 350 or Ac corresponding to the separation distance 340 or H between the suction end 118 of said valve seat 110 and the discharge end 141 of valve plug 140, can be calculated based in the following relationship:

$$Ac = \frac{\pi}{2}(Dp + Di)\sqrt{\frac{(Dp - Di)^2}{4} + H^2}$$

The second condition to attain maximum fluid flow and minimum pressure drop through the mechanically actuated traveling valve 100, requires that conical surface of revolution flow area 350 or Ac be substantially equal to or greater than the seat fluid flow area 310 or Ai. In order to comply with this second condition, it is necessary to determine minimum separation distance $H_{min}$.

The seat annular flow area 310 or Ai determines the minimum separation distance $H_{min}$ that must be achieved between the suction end 118 of said valve seat 110 and the discharge end 141 of valve plug 140 when the valve is opened. This minimum separation distance $H_{min}$ corresponds to the height of the conical surface of revolution flow area 350 that is generated by overlap 148 or S between contacting surfaces 114 of valve seat 110 and 144 of valve plug 140.

Knowing the seat annular fluid flow area 310 or Ai and that the minor diameter of the conical surface of revolution flow area 350 coincides with the inner diameter 116 or Di of the valve seat 110; while the major diameter of the same conical surface of revolution flow area 350 coincides with the outer diameter 146 or Dp of the valve plug 140, the minimum separation distance $H_{min}$ between the suction end 118 of the valve seat 110 and the discharge end 141 of the valve plug 140 can therefore also be calculated as:

$$H_{min} = \sqrt{\frac{4\,Ai^2}{\pi^2(Dp+Di)^2} - \frac{(Dp-Di)^2}{4}}$$

Thus, the separation distance 340 or H between the suction end 118 of said valve seat 110 and the discharge end 141 of the valve plug 140 must be equal to or greater than the minimum distance $H_{min}$ calculated.

In conclusion, maximum flow and minimum pressure drop through the traveling valve 100, can be accomplished, if and only if: (i) the seat annular flow area 310 or Ai is substantially equal to the plug annular flow area 300 or Ap, and at the same time (ii) the conical surface of revolution flow area 350 or Ac generated by the separation distance H (where H must be equal to or greater to $H_{min}$) between the suction end 118 of valve seat 110 and the discharge end 141 of valve plug 140 is substantially equal to or greater than the seat fluid flow area 310 or Ai.

When the mechanically actuated traveling valve 100 is in a closed position, sealing surface 114 located at the suction end 118 of valve seat 110 makes a hermetically sealing contact with sealing surface 144 located at the discharge end 141 of valve plug 140. Both the sealing surface 114 of valve seat 110 and the sealing surface 144 of valve plug 140 may be spherically contoured to define a spherical contact zone when they interface with one another. As explained above, the advantage of using a spherical contour for the preferred contacting surfaces over other differently shaped contacting surfaces is due to the fact that they are able to maintain a hermetic seal even if there is a slight misalignment between the components; however, it is important to point out that any other shape or configuration of contacting surfaces or even line contact between sealing elements that can maintain a hermetic seal, is also included in this invention.

The spherical radius 352 of the sphere that generates the spherical zones as contact surfaces 114 of valve seat 110 and 144 of valve plug 140, can be determined by taking into account: (i) the height 119 of spherical zone 114 of valve seat 110, (ii) the inner diameter 116 of valve seat 110, and (iii) the outer diameter 146 of valve plug 140.

Spherical zone height 119 should be large enough to assure a perfect seal between contacting surfaces 114 of valve seat 110 and 144 of valve plug 140. This spherical zone height 119 is considered a design parameter that appears in catalogs, other valve related literature or is otherwise provided by those skilled in the art.

Additional to the mechanically actuated traveling valve 100, the positive displacement subsurface pumps are required to work in conjunction with a standing valve and under certain circumstances, the implementation of an annular valve, which may be located at the discharge end of the pump, could also be required. At this point, it is important to make it clear, that all subsurface pumps, regardless of which standing valve is used, or whether an annular valve is implemented or not, will be more efficient if the mechanically actuated traveling valve 100 described in this invention is implemented compared to traveling valves operating just by pressure differential or those mechanically actuated that are located at the plunger's suction end.

The conventional standing valve (commonly used in the oil industry), is simply a retention valve constituted by a sealing element that can contact the seat in order to block the backflow of the fluid, and allowing its flow when the sealing element separates from said seat. The sealing element could be a ball, a plug or any other element (or elements) that when contacting the seat will form a hermetic seal. Due to the fact that said standing valve is typically used in subsurface pumps whose dimensions and characteristics appear in Standard API 11AX and/or other norms or catalogs, no further details will be provided.

In embodiments herein, the longitudinal axis of each individual component of the mechanically actuated traveling valve 100 are collinear and move along the longitudinal axis 400 of the positive displacement subsurface pump. When the valves are open, there must be a minimum distance at which the valve plug 140 separates from the valve seat 110 in order to assure minimal pressure drop and maximum fluid flow. It is contemplated that any other possible configuration and/or embodiment that comply with this concept in which the valve constituents are not collinear with the pump's longitudinal axis 400 when open or closed, are also is considered.

For both Cases A and B, the discharge end 124 of valve connector 120 can be affixed to the reciprocating motion inducing element 30, which can either be the sucker rod, a continuous rod, the rod valve (according to Standard API 11AX nomenclature) or any other means capable of transmitting reciprocating motion depending on the type of subsurface pump selected (whether rod, tubing or casing).

Embodiments of the present mechanically actuated travelling valve 100 can enable the reciprocating portion (the plunger 50 for Case A and the barrel 60 for Case B) of a positive displacement pump to descend at a faster rate due to the reduction in the drag resistance to motion caused by the increment in flow areas across said traveling valve. As such, the present valve can be used to handle any viscosity crude oil, while permitting a higher number of strokes per unit time, consequently improving the pump's performance.

Likewise, embodiments of the present traveling valve can provide a travelling valve 100 having guided sealing elements, thus reducing oil seepage across the said valve, because its operation is unaffected by the vertical component of the force of gravity, improving the overall performance of the subsurface pump at any deviation angle, particularly when used in highly deviated or horizontal wells.

Additionally, embodiments of the present mechanically actuated traveling valve 100, when placed in any position within the entire length or at the discharge end of the plunger, will open mechanically and by pressure differential in each stroke, independently of the ratio of gas dissolved in the oil, enabling that the gas that has separated from the fluid (i.e., oil with dissolved gas from the well), be displaced by liquid (oil only) downstream of said valve; reducing significantly the fluid pounding between the reciprocating element (the plunger 50 for Case A and the barrel 60 for Case B) and the liquid phase of the fluid within barrel 60, avoiding in turn the gas lock condition, improving substantially the volumetric efficiency of the positive displacement subsurface pump.

In operation, during the suction stage of the subsurface pump, mechanically actuated traveling valve 100 is closed and standing valve is open; while at the discharge stage, mechanically actuated traveling valve 100 is open and standing valve is closed.

Accordingly, the implementation of the mechanically operated traveling valve 100 in any positive displacement pump aims to provide the following advantages:

1. By equating the seat annular flow area 310 and plug annular flow area 300 (within the valve seat 110 and around the valve plug 140 respectively) and, at the same time, assuring that the conical surface of revolution flow area 350 generated by the separation distance 340 (which must be greater than or equal to $H_{min}$) between the suction end 118 of the valve seat 110 and the discharge end 141 of the valve plug 140 is equal to or greater than the seat annular flow area 310 (within the valve seat 110) of the mechanically actuated traveling valve 100, a minimal pressure drop is attained; consequently, the flow across the valve will be maximized (since the flow areas were substantially incremented) compared to other single sealing element valves.

2. By placing the mechanically actuated traveling valve 100 at the discharge end of the moveable element, it can be indistinctly implemented in pumps that have either: (i) the plunger 50 as the moveable component, or (ii) the barrel 60 as the moveable component.

3. The contacting surfaces 114 of valve seat 110 and 144 of valve plug 140 of the mechanically actuated traveling valve 100 can have a spherical zone configuration, which assures a substantially perfect seal even when slight angular misalignment appears due to wear after lengthy operation, thus being able to extend the useful life of the positive displacement subsurface pump.

4. Since traveling valve 100 operates mechanically, the gas that separates from the crude oil within barrel 60 can be displaced when the valve opens in each stroke by the fluid that is downstream of the traveling valve, thus reducing fluid pounding and avoiding gas or steam lock.

5. For Case A when the plunger 50 is the moveable component, since the mechanically actuated traveling valve 100 is located at the discharge end (or anywhere else along the entire length) of said plunger 50, the suction end of this plunger 50 will always contact the fluid before the mechanically actuated traveling valve 100 does, thus allowing for the viscosity of the fluid to generate a very significant drag force which aids in the earlier opening of the said traveling valve. Prior art did not have this advantage, since their traveling valve was specifically located at the plunger's suction end.

6.—Any positive displacement subsurface pump (with either the plunger 50 or barrel 60 as moveable elements) assembled with the mechanically actuated traveling valve 100 according to embodiments herein, together with any other standing valve, can operate more efficiently.

In those circumstances in which the positive displacement subsurface pump corresponds to Case A (where plunger 50 is the moveable element and barrel 60 is the stationary element) and it is required to handle oils with very high gas to oil ratio (high GOR) and/or said oil contains a high sand or fines cut, it is pertinent to additionally implement a commercially available annular valve.

The location in Case B of the mechanically actuated traveling valve 100 at the discharge end of the barrel 60, avoids for sand particles to enter into the subsurface pump, thus assuring in this case also, longer endurance of the barrel's inner surface, as well as, the plunger's outer surface, by reducing the possibility of sand particles getting lodged in between said contacting surfaces.

It is to be understood that the invention is not limited to positive displacement subsurface pumps since all the prior explanations are perfectly applicable to absolutely all positive displacement pumps with a reciprocating element (either the plunger or the cylinder). Furthermore, it also should be understood that the illustration described and shown herein, which is deemed to be merely illustrative of the best mode of carrying out the invention, and which is susceptible of modification of form, size, arrangement of parts and details of operation. The invention rather is intended to encompass all such modifications which are within its spirit and scope as defined by the claims.

What is claimed is:

1. A mechanically actuated traveling valve positioned within or at a discharge end of a reciprocally moving element of a positive displacement pump, having a housing with an inner periphery forming a fluid chamber, an upstream suction end and a downstream discharge end, the valve comprising:
    a reciprocating valve stem having a first end and a second end, and having an outer periphery,
    a valve connector for connecting the first end of said valve stem to a reciprocating motion inducing element of the positive displacement pump to impart therefrom a reciprocating movement of the valve stem,
    a valve seat secured within the housing, the seat having an inner periphery, the inner periphery of the seat and the outer periphery of the stem defining an annular seat fluid flow area therebetween,
    a valve plug connected to the valve stem at its second end, the valve plug having an outer periphery, the outer periphery of the plug and the inner periphery of the housing defining an annular plug fluid flow area therebetween,
    wherein a separation distance between a suction end of the valve seat and a discharge end of the valve plug defines a conical surface of revolution fluid flow area in an open position of the valve,
    wherein the annular seat fluid flow area is substantially equal to the annular plug fluid flow area,
    wherein the conical surface of revolution fluid flow area between the suction end of the valve seat and the discharge end of the valve plug is substantially equal to or greater than the annular seat fluid flow area,
    wherein upon satisfying that the conical surface of revolution fluid flow area between the suction end of the valve seat and the discharge end of the valve plug is substantially equal to the annular seat fluid flow area, a minimum necessary value of said separation distance between the suction end of the valve seat and the discharge end of the valve plug is established,
    wherein the valve is configured such that the separation distance between the suction end of the valve seat and the discharge end of the valve plug in the open position of the valve equals or exceeds said minimum necessary value;
    wherein upon satisfying simultaneously the forgoing criteria relating to the annular flow areas of the valve seat and the valve plug, as well as the separation distance between the suction end of the valve seat and the discharge end of the valve plug, the flow through the traveling valve is maximized; while, the pressure drop through it, is minimized,
    wherein the reciprocating movement of the valve stem opens the traveling valve during the pump's discharge stage, allowing fluid flow therethrough, by moving said valve plug apart from the valve seat, and
    wherein the reciprocating movement of the valve stem closes the traveling valve during the pump's suction stage, precluding fluid flow therethrough, by moving said valve plug towards said valve seat.

2. The valve of claim 1, wherein the reciprocally moving element of the positive displacement pump comprises either a pump plunger or a pump cylinder of the positive displacement pump.

3. The valve of claim 2, wherein the reciprocally moving element of the positive displacement pump is the pump plunger, and the pump cylinder is a stationary element.

4. The valve of claim 3, wherein the valve is positioned at a location within a length of the pump plunger downstream of the suction end, or at the discharge end of the pump plunger.

5. The valve of claim 2 wherein the reciprocally moving element of the positive displacement pump is the pump cylinder, the pump plunger is a stationary element, and the valve is positioned at the discharge end of the pump cylinder of the positive displacement pump.

6. The valve of claim 1, wherein a reciprocally moving element of a sucker rod string induces reciprocation of the reciprocally moving element of the positive displacement pump, and comprises a sucker rod, continuous rod, or rod valve.

7. The valve of claim 1, wherein the valve stem guides the valve plug, so that when the valve is closing as the distance between the suction end of the valve seat and the discharge end of the valve plug becomes smaller, fluid seepage is substantially nil independently of the pump's inclination angle.

8. Method for designing and building the mechanically actuated traveling valve, described in claim 1, which comprises the following steps:

a. determining a minor diameter Di of the conical surface of revolution flow area between the suction end of the valve seat and the discharge end of the valve plug, based in the following relationship:

$$Di = -S + \sqrt{-2S^2 + \left(\frac{Dc^2 + Dv^2}{2}\right)}$$

where S, Dc and Dv are established design parameters, where:
  S is a radial overlap between an outer diameter of the valve plug and an inner diameter of the valve seat,
  Dc is an inner diameter of the valve housing, and
  Dv is an outer diameter of the valve stem, b. determining a major diameter Dp of the conical surface of revolution flow area between the suction end of the valve seat and the discharge end of the valve plug, based in the following relationship:

$$Dp = Di + 2S$$

c. determining the seat fluid flow area Ai that is delimited between the inner periphery of the said valve seat and the outer periphery of the valve stem, based in the following relationship:

$$Ai = \frac{\pi}{4}(Di^2 - Dv^2)$$

d. determining a minimum separation distance $H_{min}$ between the suction end of the valve seat and the discharge end of the valve plug, based in the following relationship:

$$H_{min} = \sqrt{\frac{4 Ai^2}{\pi^2(Dp+Di)^2} - \frac{(Dp-Di)^2}{4}}$$

e. determining the plug fluid flow area Ap delimited by the inner periphery of the valve housing and the outer periphery of the valve plug, based in the following relationship:

$$Ap = \frac{\pi}{4}(Dc^2 - Di^2)$$

f. determining the conical surface of revolution fluid flow area Ac with respect to the separation distance H between the suction end of the valve seat and the discharge end of the valve plug, based in the following relationship:

$$Ac = \frac{\pi}{2}(Dp + Di)\sqrt{\frac{(Dp-Di)^2}{4} + H^2}$$

g. building the mechanically actuated traveling valve that offers maximum flow and minimum pressure drop across said valve by making sure that the calculated valve seat fluid flow area Ai delimited between the inner periphery of the said valve seat and the outer periphery of the valve stem is substantially equal to the calculated plug fluid flow area Ap delimited by the inner periphery of the valve housing and the outer periphery of the valve plug and at the same time, the separation distance H that opens the conical surface of revolution fluid flow area Ac in the open position of the valve is substantially equal to or greater than the calculated minimum separation distance $H_{min}$ between the suction end of the valve seat and the discharge end of the valve plug, thus assuring that said conical surface of revolution flow area Ac is substantially equal to or greater than said valve seat annular flow area Ai.

9. The valve of claim 4 wherein during a discharge stage, the suction end of the plunger contacts a liquid phase of a fluid within the cylinder of the positive displacement pump before the suction end of the valve does, thus allowing a drag force acting on said plunger to reduce its velocity as it submerges into the liquid phase.

10. The valve of claim 9 wherein said valve will open when the valve plug separates from the valve seat in every stroke of the reciprocating motion of said plunger due to a sum of forces produced by a (i) weight of the motion inducing element, (ii) friction between an inner surface of the cylinder and an outer surface of the plunger, (iii) pressure differential between the suction and discharge ends of said valve, and (iv) drag force as the plunger submerges into the liquid phase of the fluid within the cylinder.

11. The valve of claim 10 wherein a gas which separates during a suction stage of the pump from a fluid that contains a dissolved gas, within the pump cylinder between said valve and the liquid phase of the fluid, will be discharged in every stroke of the reciprocation motion of said plunger, thus eliminating the possibility of a gas lock condition and reducing a fluid pounding effect when the suction end of said plunger plunges into the liquid phase of said fluid.

12. The valve of claim 1 wherein, in order to be able to maintain a surface contact hermetic seal even if there is a misalignment between sealing surfaces, contact surfaces at the suction end of the valve seat and at the discharge end of the valve plug both have contours that correspond to concentric spherical zones.

13. The valve of claim 1 wherein, in order to be able to maintain a line contact hermetic seal even if there is a misalignment between sealing surfaces, a first contact surface at the discharge end of the valve plug has a first contour that corresponds to a spherical zone, while a second contact surface at the suction end of the valve seat has a second contour that corresponds to a different shape or configuration.

14. The valve of claim 13 wherein said second contour at the second contact surface is shaped or configured to provide line contact with the first contour at the first contact surface.

15. The valve of claim 2 wherein the reciprocally moving element is the pump cylinder, and the pump plunger is a stationary element.

* * * * *